Patented Feb. 11, 1936

2,030,584

UNITED STATES PATENT OFFICE 2,030,584

INSECTICIDE

Clyde C. Hamilton, Highland Park, N. J.

No Drawing. Application June 5, 1934,
Serial No. 729,086

4 Claims. (Cl. 167—24)

This invention relates to improvements in insecticides and in the process for making them. The insecticide consists of finely powdered derris and/or cube root, and oil and water emulsified together to form a paste emulsion, dilutable with water for spraying or any other method of use. The invention depends upon my discovery that the natural gums, resins and saponin inherent in the finely powdered derris and/or cube root can be relied upon to effect the emulsification without using any foreign or extraneous emulsifying agent. If the proportion of derris or cube root be too small relatively to the oil to make a stable mixture, then a relatively small and minimum proportion of an agent such as colloidal clay may be used for the purpose of giving the mixture body so it will not separate out on standing.

Previous insecticides for spraying plants and containing the toxic principles of derris root or cube root have been manufactured by extracting the toxic principles with solvents, such as acetone, alcohol, ether, etc., from the coarsely ground root; and then combining the liquid extract or dried toxic extractives with oil and water and with an emulsifying agent to form an emulsion of the ingredients.

I have found by much experimentation that extracts of the active principles of derris or cube root in solvents, such as acetone, alcohol, etc., or the dried residues of these extracts will not emulsify the oil in water. The emulsification of the oil by my invention is apparently due to the inherent colloidal distribution of the gums, resins, saponin, etc., in the plant cells being soluble by water and acting as an emulsifying agent. However, when they are extracted by the usual solvents and used either in solution or in the dry condition, emulsification of the oil in water does not occur.

By my invention, I avoid this labor and expense of extraction of the toxic principles with the aforesaid solvents but use the entire derris or cube root in its natural state except that it is finely powdered to make available the emulsifying gums, resins, saponin and the like. In this way I not only save manufacturing expense but also find that I am able to get improved or greater toxicity for the insecticide. Also, I am able to avoid emulsifying agents extraneous to the derris and cube root and which I find are injurious to the toxic principles. Moreover, I get quicker breaking emulsions with the advantages of such, all as will hereinafter appear in greater detail.

To make up the paste emulsion or concentrate, I mix the finely powdered derris root or cube root with water and a suitable oil (either mineral, vegetable or animal) and then agitate these ingredients together into an emulsion in a machine of any suitable type. The emulsifying agent consists of the natural gums, resins, saponin or other emulsifying agents which I have discovered to be present in derris and cube root. There are enough of these to make a paste emulsion which will not separate upon standing when there are three or four parts by weight of the derris and cube root to eight parts of water and eight parts of oil.

It only becomes necessary to use an agent such as clay in case the proportion of derris and cube root be reduced to as low as one part by weight thereof to eight parts each of oil and water to make a physically stable emulsion. To make stable physical emulsions, that is to say, an emulsion which will not separate on standing, with said small proportion of finely powdered derris and/or cube root, I add two-thirds to one part of colloidal clay to the mixture. Any colloidal clay such as wilkeite, bentonite, etc., may be used which has the property of taking up water to form a gel. The proportion of colloidal clay used in the formula will depend upon the proportion of derris or cube root, the proportion of emulsifying gums and resins they contain, and the degree of thickness desired for the emulsified concentrate. In general, the finished insecticide should be thick enough so that it will not separate upon standing and thin enough to dilute readily with water for spraying.

In making up the mixtures for emulsification, the powdered derris root or cube root may be added either to the oil or to the water. However, if colloidal clay is used it should be added to the water in the first instance instead of to the oil. Mixing the colloidal clay with the powdered derris root or cube root, then adding this to the water, and finally adding the oil is the best method of procedure. As indicated, a satisfactory stable insecticide mixture of relatively low derris root content is made by incorporating together as aforesaid eight parts of oil, eight parts of water, one part of powdered derris or cube root, and two-thirds to one part of colloidal clay, all of these parts being taken by weight.

To prevent fermentation and consequent loss in toxicity it is desirable to incorporate a small percentage, for example ½ to 1%, of a germicide or preservative such as carbolic acid with the foregoing.

In making up the aforesaid low proportion derris or cube root insecticide, I can of course use other auxiliary emulsifying agents such as a soap. For example, I may use a sodium, or a potassium or an ethanolamine soap instead of the colloidal clay.

An antioxidant such as tannic acid may also be added to the formula with the object of making the insecticide more stable both in the concentrated and diluted form against oxidation by the atmospheric air.

The paste emulsion insecticide produced as aforesaid, makes a quick breaking emulsion when diluted with water for spraying.

I will now refer to some of the advantages of my improved insecticides over derris root and cube root insecticides as heretofore made with the toxic principles extracted by solvents such as acetone, alcohol, ether, ethylene, dichloride, etc., and with the extractives combined into an emulsion with oil and water by means of an emulsifying agent such as soap.

In the first place, the insecticide of my invention is found to have greater toxicity than that made in accordance with the chemical extraction method heretofore referred to. There are various reasons for this. One is that since my process involves no separate extraction of the toxic principles, there is no loss of toxicity due to inefficiency in the extraction. Further, the necessarily greater proportion of soap or other extraneous emulsifying agent in the insecticide made by the prior art extraction method is injurious to the rotenone and other toxic principles of the derris and cube root. This injurious action may occur either in the emulsion or after it has been diluted with water and applied to the object to be sprayed. In my insecticide the natural gums and resins found in the derris root or cube root act as the primary or main emulsifier for the mixture and injurious extraneous chemicals are introduced to a minimum or not at all.

For these and possibly other reasons, the fact, as based on repeated tests, is that insecticide sprays of my present invention possess from 15 to 20% greater toxicity to plant lice than sprays of the same high dilution made from derris and cube insecticides of the chemical extracted kind.

Due to the quick breaking when the spray is applied, the water evaporates rapidly, leaving on the plant the toxic substances contained in the water, in the particles of derris root or cube root and in the oil. Meanwhile the released oil spreads over the sprayed surface enveloping and covering the small particles of derris powder or cube powder and also covering the toxic substances which remain after the water evaporates. This coating by the oil of the toxic substances excludes the atmospheric oxygen and prevents it from reacting injuriously therewith. The fact that there is little or no soap or other extraneous emulsifier, makes the sprayed emulsion quicker breaking than it otherwise would be and also enables a smaller proportion of oil to be used in making up the insecticide.

The insecticide of the present invention is also easier and cheaper to prepare because no extraction of the toxic principles with the recovery of solvents is necessary and there is a saving in extra chemicals used for emulsifying.

By "derris and/or cube root" in the appended claims, I mean to include both the root and any other parts of these plants which contain toxic and emulsifying substances.

What I claim is:

1. An insecticide including, water, a suitable oil and finely powdered natural parts of a plant selected from the group consisting of derris and cube root containing an inherent emulsifier and properties toxic to insects.

2. An insecticide concentrate including, water, oil and finely powdered natural parts of a plant selected from the group consisting of derris and cube root containing an inherent emulsifier and properties toxic to insects, all mixed together in proportions to form a paste emulsion.

3. An insecticide emulsion including, water, a suitable oil, a preservative and finely powdered natural parts of a plant selected from the group consisting of derris and cube root containing an inherent emulsifier and properties toxic to insects, said emulsion being supplemented when said plant parts are reduced in amount as herein set forth by an auxiliary emulsifier such as colloidal clay in small amount.

4. A dilutable paste emulsion containing water, a suitable oil, finely powdered natural parts of a plant selected from the group consisting of derris and cube root, containing an inherent emulsifier consisting of the natural gums, resins and saponin of said plant parts and properties toxic to insects, said emulsion being supplemented when said plant parts are reduced in amount as herein set forth, by an auxiliary emulsifier such as colloidal clay in small amount.

CLYDE C. HAMILTON.